United States Patent [19]

Ciardi et al.

[11] Patent Number: 5,355,179
[45] Date of Patent: Oct. 11, 1994

[54] HUE CONTROL WITHOUT CHROMINANCE DEMODULATION FOR PAL

[75] Inventors: John J. Ciardi, Beaverton; Terrence J. Trausch, Portland, both of Oreg.

[73] Assignee: Tektronix, Inc., Wilsonville, Oreg.

[21] Appl. No.: 181,484

[22] Filed: Jan. 14, 1994

Related U.S. Application Data

[63] Continuation of Ser. No. 20,937, Feb. 22, 1993, abandoned.

[51] Int. Cl.$^5$ .............................................. H04N 9/64
[52] U.S. Cl. ..................................... 348/654; 348/651
[58] Field of Search ............... 348/649, 651, 652, 653, 348/654, 663; H04N 9/68, 9/70, 9/72, 9/71, 9/73, 9/64

[56] References Cited

U.S. PATENT DOCUMENTS

| | | | |
|---|---|---|---|
| 3,872,498 | 3/1975 | Pritchard | 358/21 |
| 4,359,756 | 10/1982 | Schneider et al. | 358/27 |
| 4,644,389 | 2/1987 | Nakagawa et al. | 358/28 |
| 4,860,091 | 8/1989 | Kimura et al. | 358/22 |
| 5,182,633 | 1/1993 | Antonio et al. | 358/11 |

FOREIGN PATENT DOCUMENTS

0077486  4/1986  Japan ........................ H04N 9/68

Primary Examiner—Victor R. Kostak
Assistant Examiner—Nathan J. Flynn
Attorney, Agent, or Firm—Francis I. Gray

[57] ABSTRACT

A hue control circuit for adjusting the color phase of a composite PAL television signal without demodulating the chrominance component of the composite PAL television signal uses a polyphase interpolator to change the phase of the modulated chrominance component. A set of coefficients corresponding to a desired hue adjustment is applied to the polyphase interpolator. A hue coefficient address circuit addresses a coefficient memory containing a plurality of sets of coefficients, the sets being in complementary pairs. During each horizontal blanking line interval for a given desired hue adjustment the hue coefficient address circuit swaps the sets of coefficients between the complementary pair defining the desired hue adjustment in synchronization with the alternating sign of one of the color difference components of the modulated chrominance component on a line by line basis. The adjusted modulated chrominance component is combined with the luminance component, suitably delayed, to produce an output composite PAL television signal with the desired hue adjustment.

3 Claims, 1 Drawing Sheet

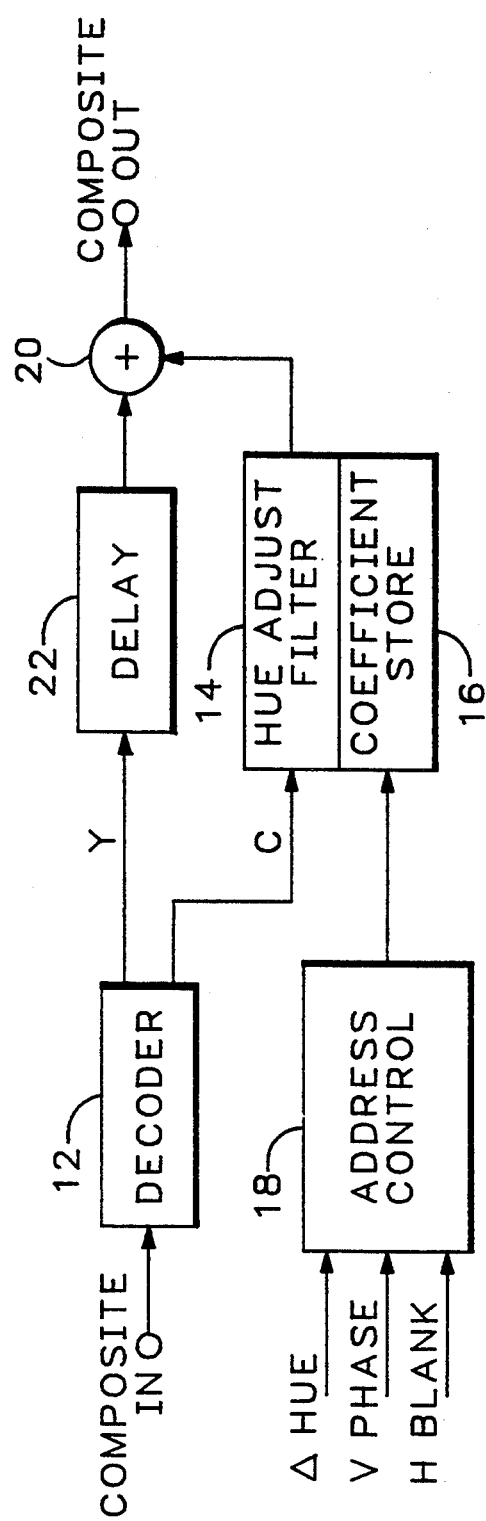

HUE CONTROL WITHOUT CHROMINANCE DEMODULATION FOR PAL

This is a continuation of application Ser. No. 08/020,937 filed Feb. 22, 1993 and now abandoned.

BACKGROUND OF THE INVENTION

The present invention relates to hue control of a composite color video signal, and more particularly to digital hue control without chrominance demodulation for PAL television by using a polyphase interpolator to change the phase of the color difference signals.

In the PAL television standard, one of the commonly used broadcast television standards used throughout the world, color information is represented by the phase of quadrature modulated color difference signals, U and V. Traditionally, because of the alternation of sign of one of these components, V, from line to line, phase changes, or color or hue changes, are accomplished by demodulating the chrominance information of the composite PAL signal, changing the color difference signals, and then remodulating the new color difference signals. To achieve the chrominance information demodulation the composite PAL signal is decoded into luminarice Y and modulated color C signals. Demodulating and remodulating the chrominance signal adds additional circuitry with its attendant space and expense costs.

What is desired is a hue control method without chrominance demodulation.

SUMMARY OF THE INVENTION

Accordingly the present invention provides hue control for a composite PAL television signal without chrominance demodulation by using a polyphase interpolator where complementary coefficients are alternated line by line in synchronization with the sign switching of a color difference component. A composite PAL television signal is separated into a luminance component and a modulated chrominance component by a decoder. The modulated chrominance component is input to a transversal digital filter configured as a polyphase interpolator. The coefficients for the filter are contained in a memory that is addressed by a coefficient address circuit. The coefficients are complementary about a center address to provide for corresponding positive and negative phase changes. The coefficient address circuit accepts a desired hue change value, a horizontal blanking flag and a phase signal for the V component and provides the address to the coefficient memory to select the coefficients corresponding to the desired hue change, alternating the complementary coefficients during the horizontal blanking interval. The adjusted modulated chrominance from the polyphase interpolator is combined with the luminance signal, suitably delayed, to produce a composite PAL output television signal with the desired hue adjustment.

The objects, advantages and other novel features of the present invention are apparent from the following detailed description when read in conjunction with the appended claims and attached drawing.

BRIEF DESCRIPTION OF THE DRAWING

The FIGURE is a block diagram of a hue control circuit without chrominance demodulation according to the present invention.

DESCRIPTION OF THE PREFERRED EMBODIMENT

Referring to the FIGURE a composite PAL television signal is input to a decoder 12 to produce a luminance component Y and a modulated chrominance component C, as is well known in the art. The modulated chrominance component C is the summation of quadrature modulated color difference signals U and V, with the sign of V alternating from line to line. The modulated chrominance component C is input to a transversal digital filter 14 configured as a polyphase interpolator, such as that described in U.S. Pat. No. 5,274,372 issued Dec. 28, 1993 to Ajay Luthra et al entitled "Sampling Rate Conversion Using Polyphase Filters with Interpolation". The filter coefficients are stored in a coefficient memory 16 as complementary sets of coefficients. There are numerous methods for designing polyphase coefficient sets detailed in the literature, such as Chapter 4 of "Multirate Digital Signal Processing" by Ronald E. Crochiere and Lawrence R. Rabiner, published by Prentice Hall 1983. The method used is irrelevant as long as the accuracy of the phase shift implemented by the coefficient set exceeds the desired phase shift resolution. Coefficient word width quantization and length of the coefficient set, i.e., number of coefficients, are parameters that limit accuracy.

Each coefficient set is designed to implement a chrominance phase offset with no chrominance amplitude change over the PAL video bandwidth (5 MHz) during the active video picture. For example with 128 sets, or 64 complementary pairs of sets, a phase adjustment range of $+/-22.5$ degrees may be provided with adjacent coefficient sets differing in phase by 0.352 degrees, i.e., $22.5/64=0.352$. A coefficient address logic circuit 18 provides addresses to the coefficient memory 16 to select the set of coefficients to be applied to the filter 14 for each line of active video in the modulated chrominance component C. Control signals applied to the coefficient address logic circuit 18 include a hue control signal that indicates the amount of desired hue adjustment, a V phase signal that indicates the sign of the V color difference component, and a horizontal blanking flag that indicates the horizontal blanking interval between lines of the composite PAL television signal. As an example, no hue change may correspond to address 64 when addressed from zero to 127, with a plus one degree phase offset being represented by the set of coefficients at coefficient address 67 ($3 \times 0.352 = 1.05$) and a minus one degree phase offset being represented by the set of coefficients at coefficient address 61. The V phase control signal alternates between one and zero from line to line in synchronization with the alternating V color difference component of the modulated chrominance component C. As a result the pair of complementary coefficient sets representing the chosen phase and its negative equivalent are swapped on alternating lines. The horizontal blanking flag signal forces the coefficient swapping to occur during the horizontal blanking interval so there are no artifacts of the swapping visible during the active video display. Also the horizontal blanking flag is provided to ensure that the color burst phase is not changed.

The adjusted modulated chrominance component from the polyphase interpolator 14 is input to a combining circuit 20. Also input to the combining circuit 20 is the luminance component Y from the decoder 12 via a delay circuit 22. The delay circuit 22 compensates for the delay resulting from the processing of the modulated chrominance component C by the polyphase interpolator 14 to produce the adjusted modulated chrominance component.

Thus the present invention provides hue control for a composite PAL television signal without chrominance demodulation by adjusting the hue of the modulated chrominance component of the composite PAL signal using a polyphase interpolator and a hue coefficient control circuit that swaps complementary coefficient sets from line to line in synchronization with the alternating color difference component of the chrominance.

What is claimed is:

1. A hue control circuit comprising:
   means for separating a modulated chrominance component from a luminance component in a composite television signal;
   means for filtering the modulated chrominance component using a set of coefficients corresponding to a desired hue adjustment, the set of coefficients being selected from a plurality of sets of coefficients with each set of coefficients representing a different phase offset, to produce an adjusted modulated chrominance component; and
   means for combining the adjusted modulated chrominance component with the luminance component to produce an output composite television signal incorporating the desired hue adjustment.

2. A hue control circuit comprising:
   means for separating a modulated chrominance component from a luminance component in a composite television signal;
   a polyphase interpolator having the modulated chrominance component as an input and producing an adjusted modulated chrominance component as an output, the adjusted modulated chrominance component being determined by a set of coefficients applied to the polyphase interpolator;
   means for storing sets of coefficients for the polyphase interpolator;
   means for addressing the sets of coefficients to select the set of coefficients corresponding to a desired hue adjustment as a function of a hue control signal, such selection occurring during a horizontal blanking interval of the composite television signal; and
   means for combining the adjusted modulated chrominance component with the luminance component to produce an output composite television signal incorporating the desired hue adjustment.

3. A hue control circuit as recited in claim 2 wherein the composite television signal is a composite PAL television signal, the sets of coefficients are in the form of complementary pairs, and the addressing means swaps between the sets of coefficients forming a complementary pair for the desired hue adjustment in synchronization with a color difference component of the modulated chrominance component that changes sign from line to line of the composite PAL television signal.

* * * * *